Figure 1:
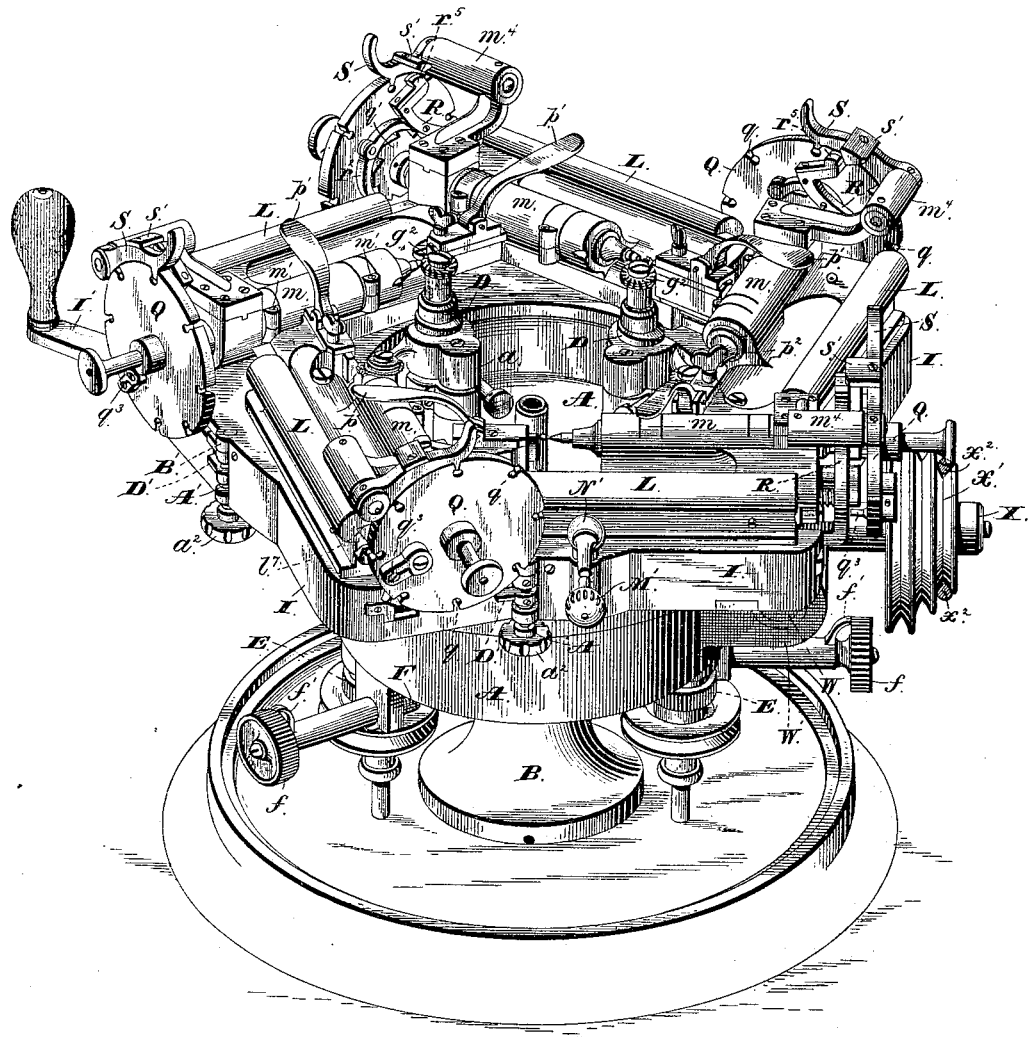

(No Model.)  13 Sheets—Sheet 1.

F. LEMAN.
PINION CUTTING MACHINE.

No. 350,142.  Patented Oct. 5, 1886.

Witnesses:
Jas. E. Hutchinson.
Henry C. Hazard.

Inventor:
Frank Leman, by
Prindle & Russell, his Attys.

(No Model.)  F. LEMAN.  13 Sheets—Sheet 3.
PINION CUTTING MACHINE.

No. 350,142.  Patented Oct. 5, 1886.

(No Model.) 13 Sheets—Sheet 4.

F. LEMAN.
PINION CUTTING MACHINE.

No. 350,142. Patented Oct. 5, 1886.

(No Model.) 13 Sheets—Sheet 5.

F. LEMAN.
PINION CUTTING MACHINE.

No. 350,142. Patented Oct. 5, 1886.

Witnesses:
Jas. E. Hutchinson
Henry C. Hazard

Inventor.
Frank Leman, by
Dindle & Russell, his Attys (No Model.) 13 Sheets—Sheet 6.

F. LEMAN.
PINION CUTTING MACHINE.

No. 350,142. Patented Oct. 5, 1886.

Witnesses:
Jas. E. Hutchinson.
Henry C. Hazard.

Inventor.
Frank Leman, by
Crindle and Russell, his Att'ys (No Model.) 13 Sheets—Sheet 7.
F. LEMAN.
PINION CUTTING MACHINE.
No. 350,142. Patented Oct. 5, 1886.
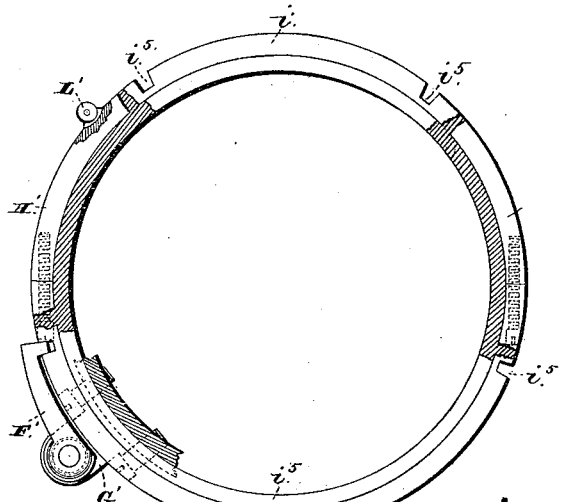
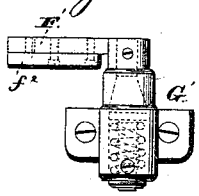
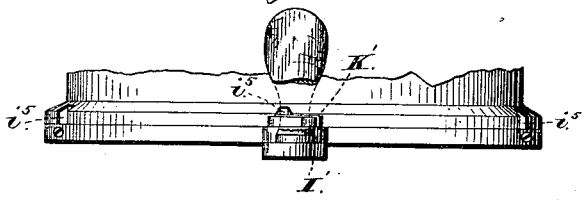
Witnesses:
Jas. E. Hutchinson
Henry C. Hazard
Inventor
Frank Leman, by
Prindle & Russell, his Attys (No Model.) 13 Sheets—Sheet 8.

F. LEMAN.
PINION CUTTING MACHINE.

No. 350,142. Patented Oct. 5, 1886.

Witnesses:
Jas. E. Hutchinson.
Henry C. Hazard.

Inventor.
Frank Leman, by
Crindle & Russell, his Atty.

(No Model.)  13 Sheets—Sheet 9.
F. LEMAN.
PINION CUTTING MACHINE.
No. 350,142.  Patented Oct. 5, 1886.
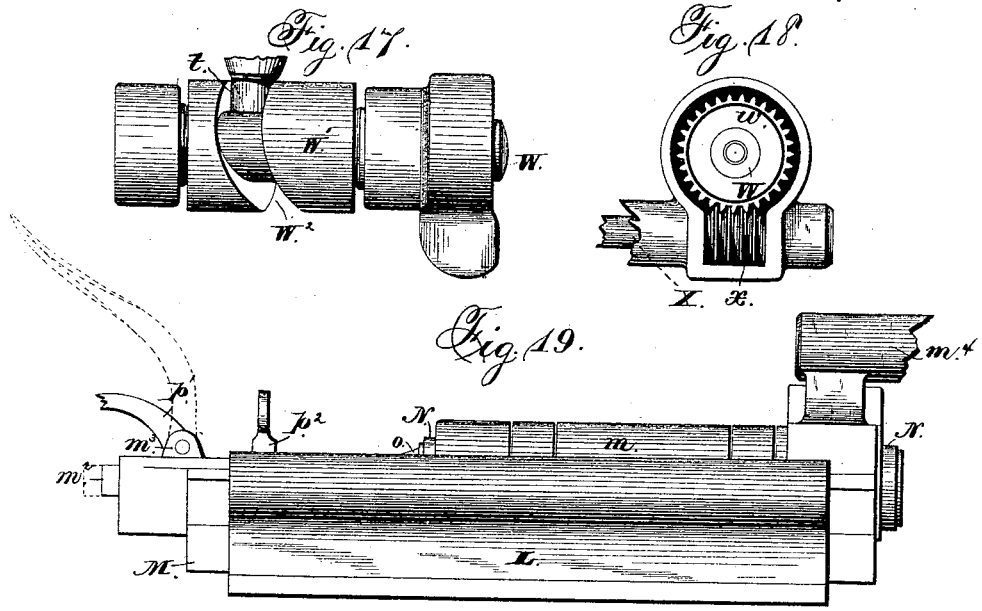
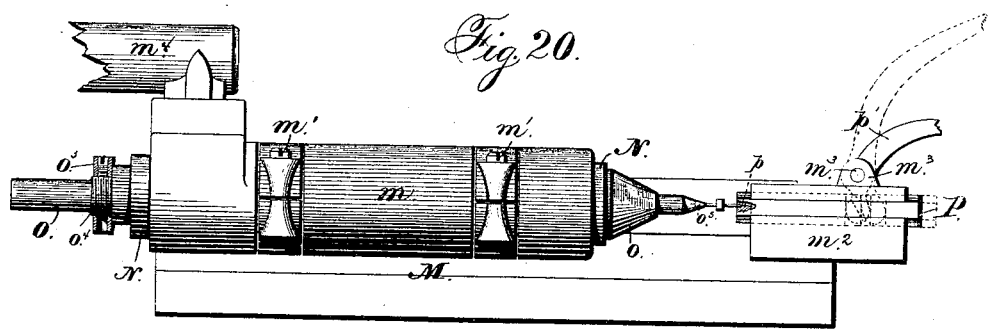
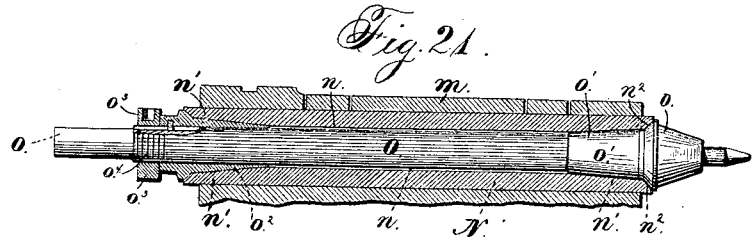

(No Model.) 13 Sheets—Sheet 10.
F. LEMAN.
PINION CUTTING MACHINE.
No. 350,142. Patented Oct. 5, 1886.
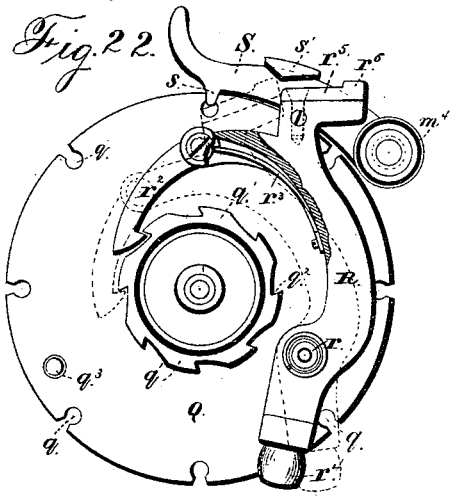
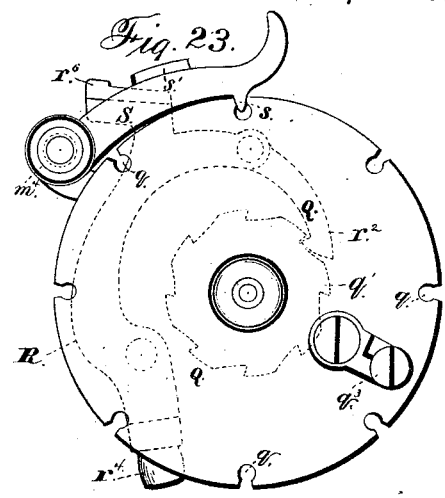
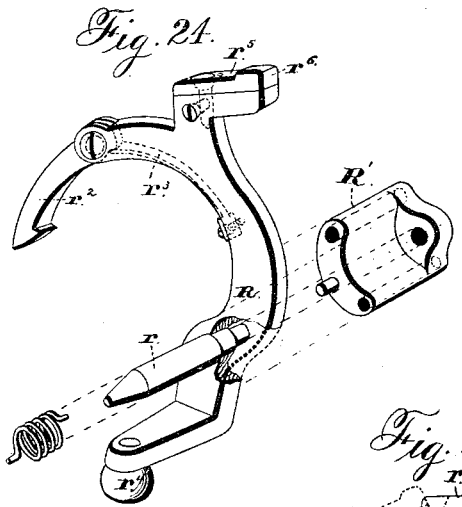
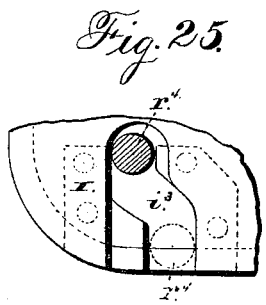
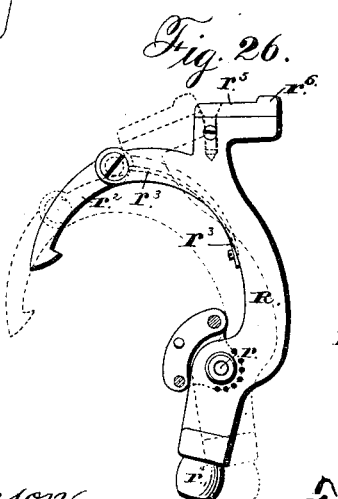
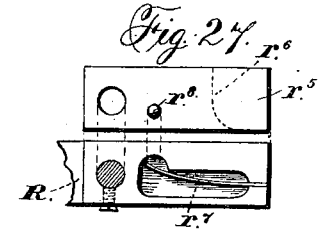
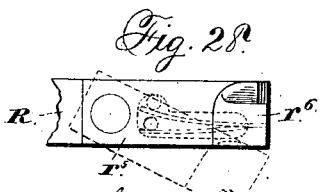
Witnesses:
Jas. E. Hutchinson
Henry C. Hazard
Inventor
Frank Leman, by
Prindle and Russell, his Attys (No Model.) 13 Sheets—Sheet 11.

F. LEMAN.
PINION CUTTING MACHINE.

No. 350,142. Patented Oct. 5, 1886.

Witnesses:
Jas. E. Hutchinson.
Henry C. Hazard.

Inventor:
Frank Leman, by
Crandle & Russell, his Attys.

N. PETERS, Photo-Lithographer, Washington, D. C.

(No Model.) 13 Sheets—Sheet 12.
F. LEMAN.
PINION CUTTING MACHINE.
No. 350,142. Patented Oct. 5, 1886.
Fig. 32.
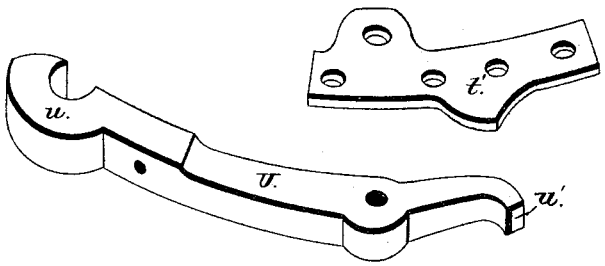
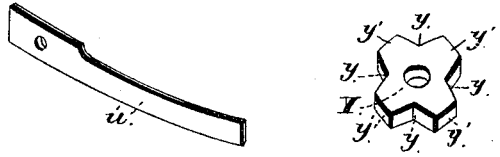
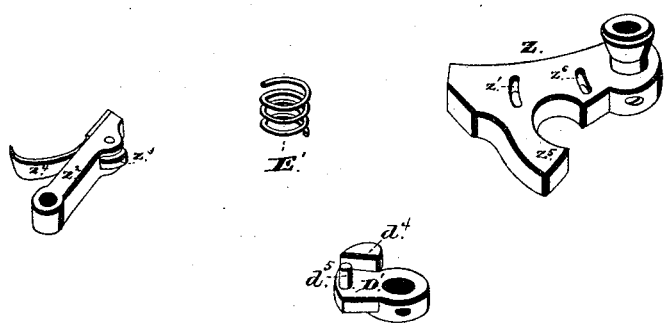
Witnesses:
Jas. E. Hutchinson
Henry C. Hazard
Inventor
Frank Leman, by
Crindle & Russell, his Attys (No Model.) 13 Sheets—Sheet 13.

F. LEMAN.
PINION CUTTING MACHINE.

No. 350,142. Patented Oct. 5, 1886.

Witnesses:
Jas. E. Hutchinson.
Henry C. Hazard.

Inventor:
Frank Leman, by
Prindle and Russell, his Attys.

N. PETERS, Photo-Lithographer, Washington, D. C.

UNITED STATES PATENT OFFICE.

FRANK LEMAN, OF ELGIN, ILLINOIS.

PINION-CUTTING MACHINE.

SPECIFICATION forming part of Letters Patent No. 350,142, dated October 5, 1886.

Application filed September 15, 1883. Serial No. 106,556. (No model.)

*To all whom it may concern:*

Be it known that I, FRANK LEMAN, of Elgin, in the county of Kane, and in the State of Illinois, have invented certain new and useful Improvements in Pinion-Cutting-Machines; and I do hereby declare that the following is a full, clear, and exact description thereof, reference being had to the accompanying drawings, in which—

Figure 2:
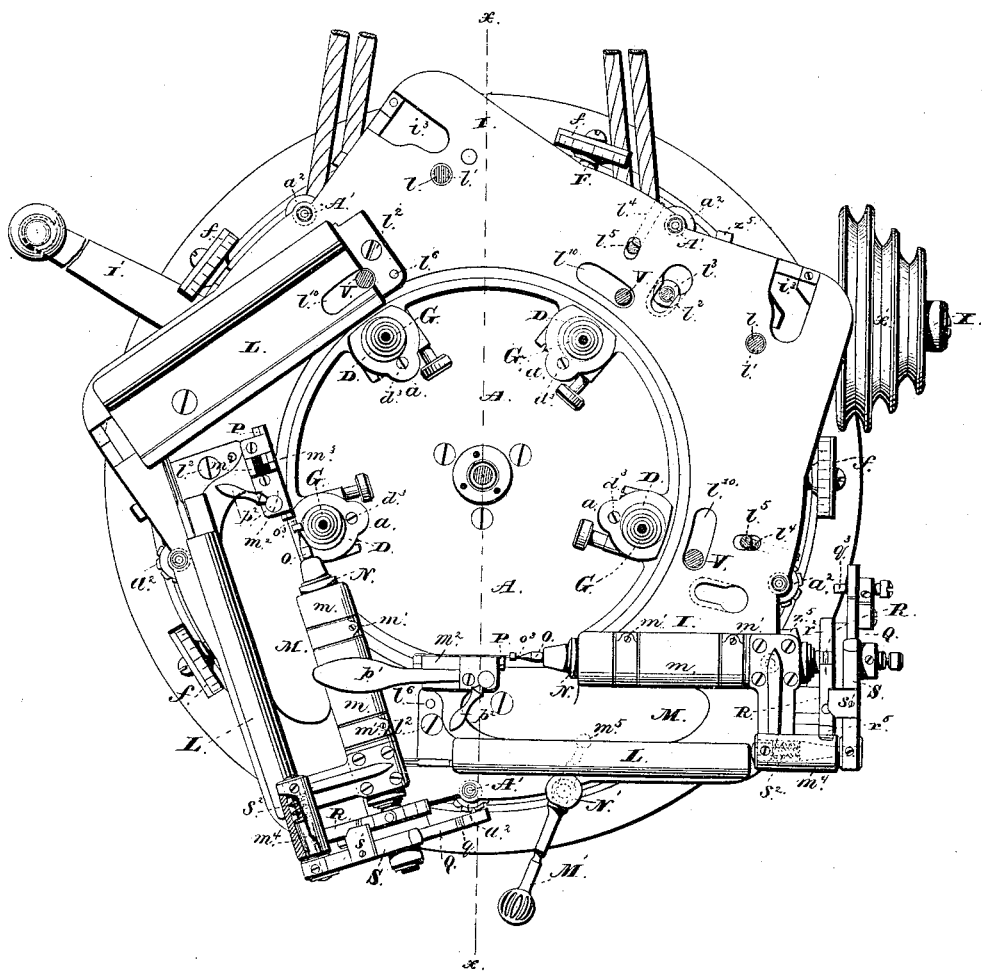
Figure 3:
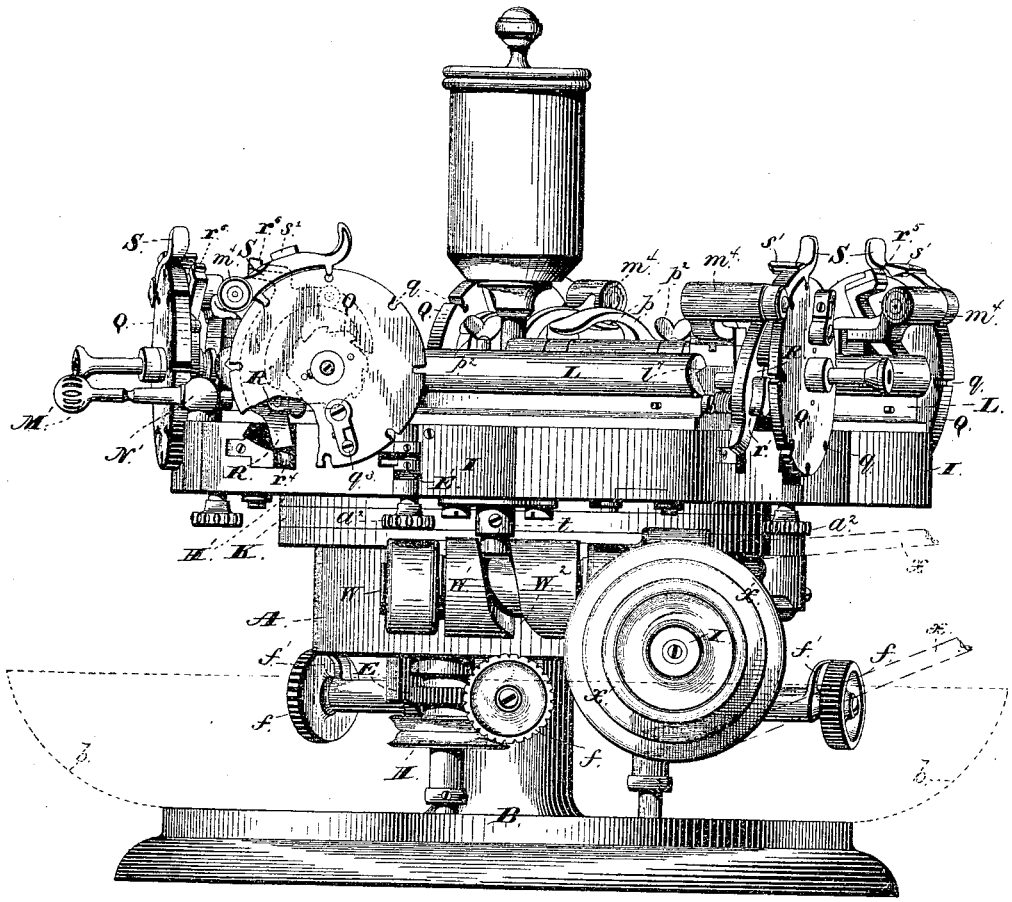
Figure 4:
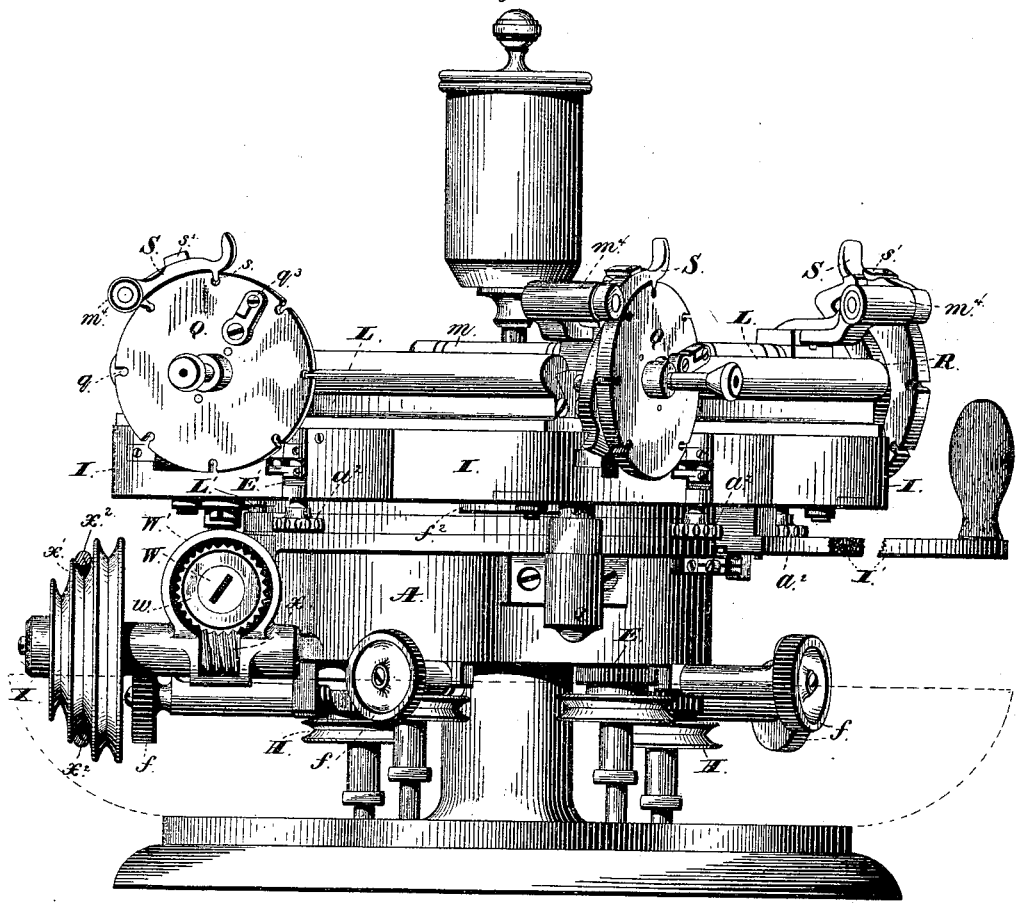
Figure 5:
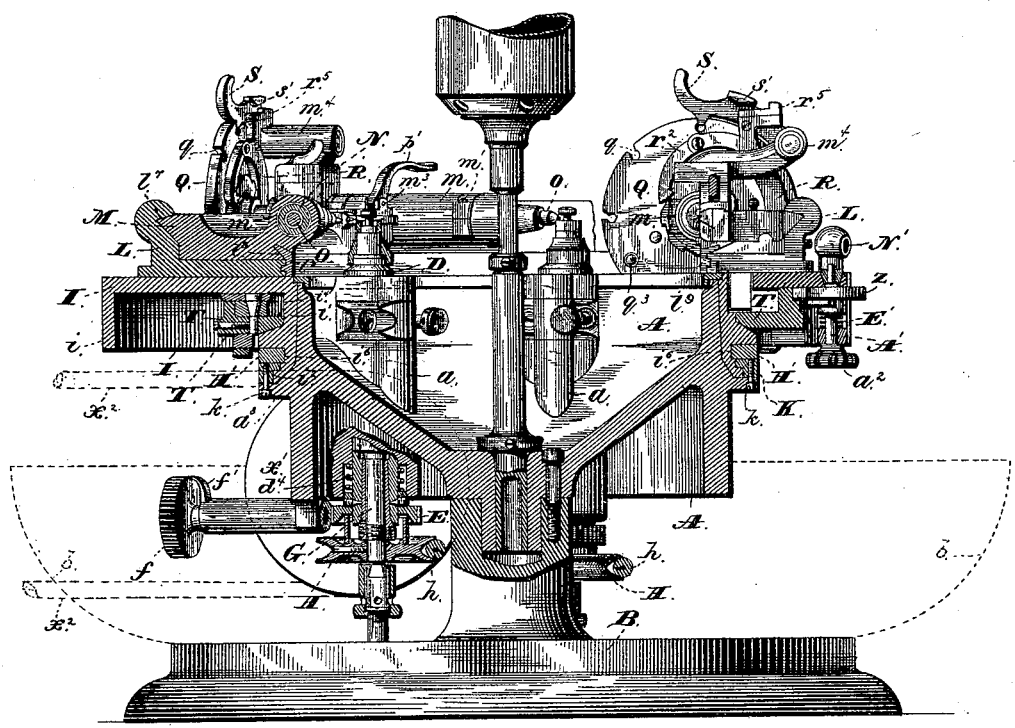
Figure 6:
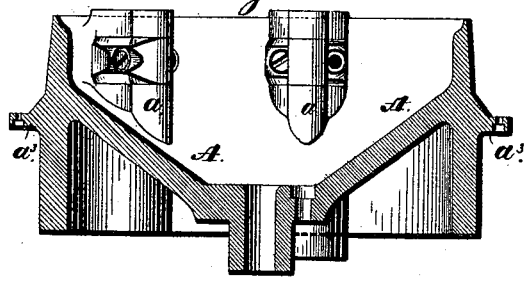
Figure 7:
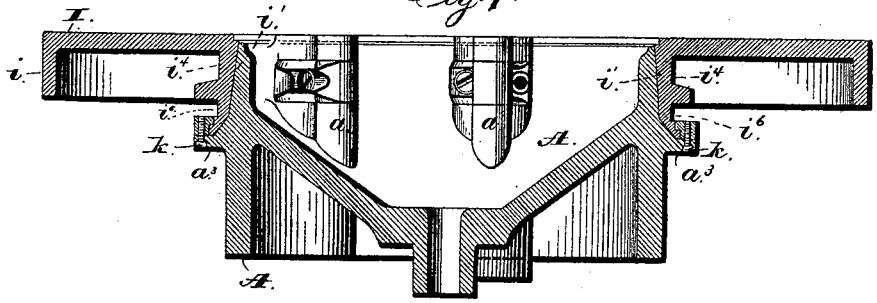
Figure 8:
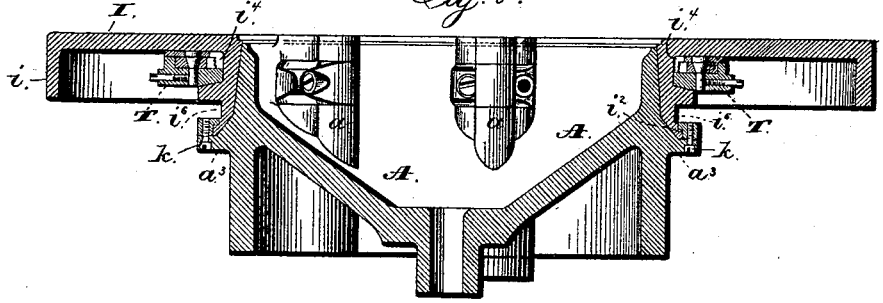
Figure 9:
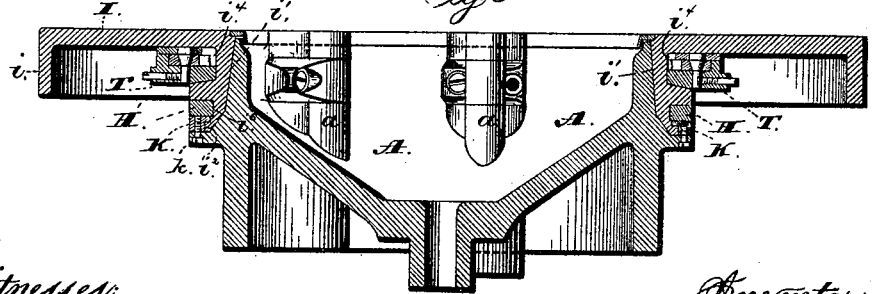
Figure 14:
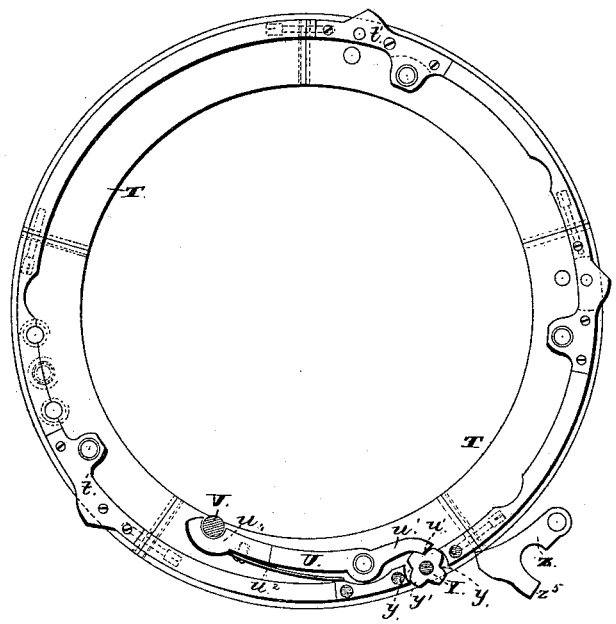
Figure 15:
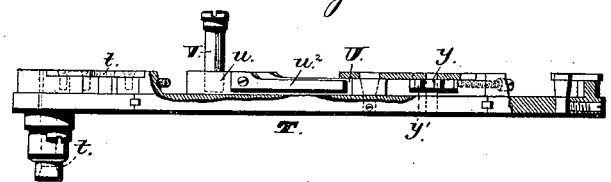
Figure 16:
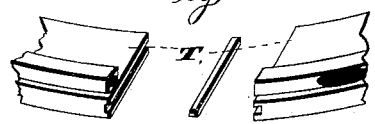
Figure 29:
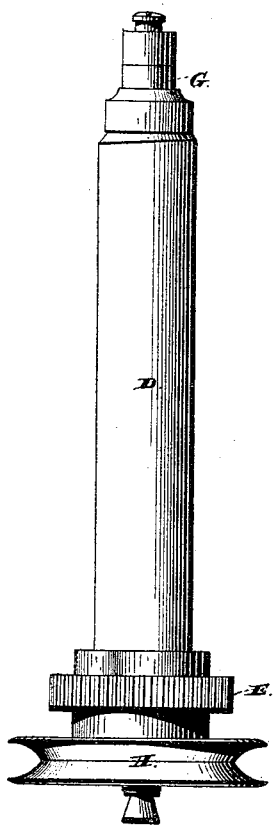
Figure 30:
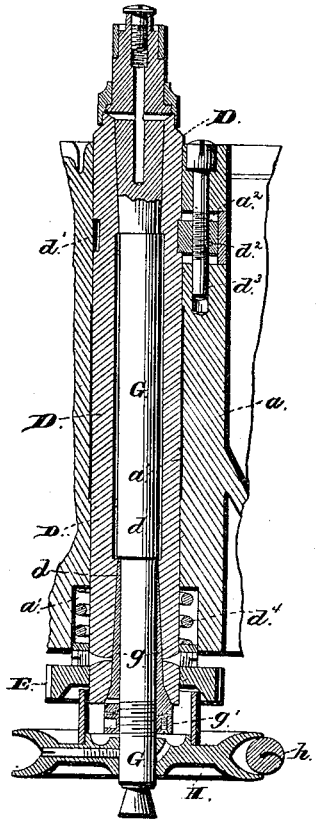
Figure 31:
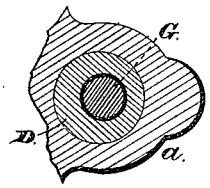
Figure 33:
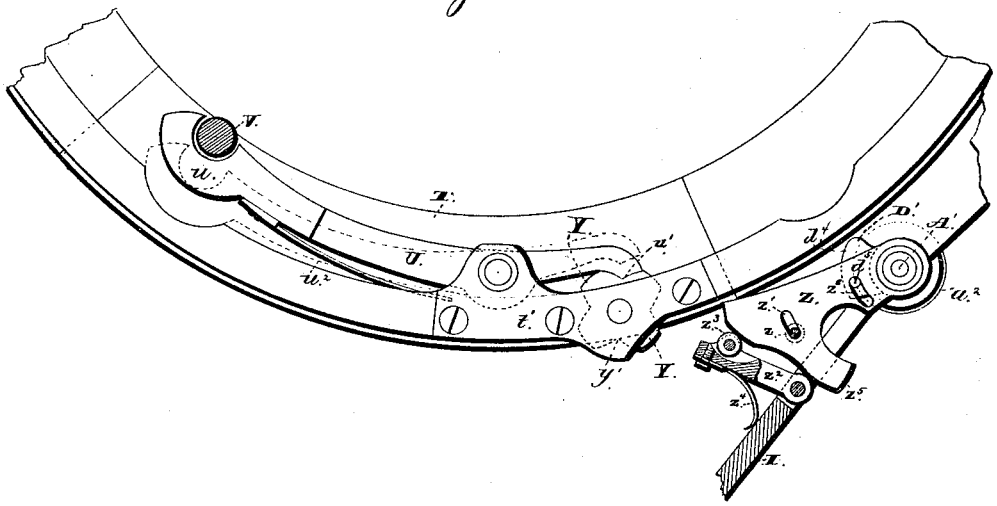
Figure 34:
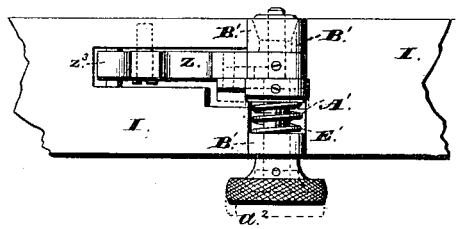

Figure 1 is a perspective view of my machine as arranged for use. Fig. 2 is a plan view of the upper side of the same. Figs. 3 and 4 are elevations of opposite sides of the machine. Fig. 5 is a vertical central section of said machine upon line $x\ x$ of Fig. 2. Fig. 6 is a vertical central section of the frame or body of my machine before the attachment of the operative parts. Fig. 7 is a like view of the same and of the rotatable table. Fig. 8 is a vertical central section of said frame, rotatable table, and reciprocable ring united together. Fig. 9 is a like view of said frame, rotatable table, reciprocable ring, and the flange-ring used for confining said table in position upon said frame. Fig. 10 is a plan view of the lever and ring, with their connecting parts, for turning the table into position to engage with the reciprocating mechanism. Fig. 11 is a front elevation of the same. Fig. 12 is a like view of the spring-pawl employed for connecting said ring with the table. Fig. 13 is a side elevation of the spring-pawl used for connecting the operating-handle with said ring. Fig. 14 is a plan view of the reciprocating ring employed for moving the slides lengthwise in front of the cutters. Fig. 15 is a front elevation of the same, a portion of said ring being broken away to show the arrangement of the hooks and star-wheels. Fig. 16 is a perspective view of the engaging ends of two of the sections of said ring, of their intermediate tongue or key, and of the confining-screw, separated from each other. Fig. 17 is a front elevation of the cam-shaft and connections for giving motion to said reciprocating ring. Fig. 18 is an end elevation of the same. Fig. 19 is a front elevation of one of the slides used for holding and rotating the pinions. Fig. 20 is an elevation of the inner side of the same. Fig. 21 is a plan view of a slide-spindle and a central longitudinal section of its inclosing parts. Fig. 22 is an elevation of the inner side of the index and its operative mechanism. Fig. 23 is a like view of the outer side of the same. Fig. 24 is a perspective view of the index-operating lever, its bracket-bearing and spring separated from each other and from said index. Fig. 25 is a plan view of a portion of the revolving table, containing a cam-groove or race that receives one end of the pivoted arm which carries the ratchet-pawl of each index. Fig. 26 is a front elevation of said pivoted arm, the full lines showing one position and the dotted lines another position of the same. Fig. 27 is an enlarged plan view of the pivoted lug or pawl and the connecting portion of the upper end of said arm separated from each other. Fig. 28 is a like view of the same united. Fig. 29 is a side elevation of one of the cutter-spindles and its inclosing-quill. Fig. 30 is a central longitudinal section of said quill and a partial section of said spindle. Fig. 31 is a horizontal section of said parts. Fig. 32 is a perspective view of the mechanism which operates to prevent the slide from engaging with the vibrating ring, the parts being separated from each other. Fig. 33 is a plan view of the same combined; and Fig. 34 is a side elevation of said mechanism, the full lines showing the positions of parts when the tripping-cam is in position for action and the dotted lines the positions of the same when said cam is thrown out of action.

Letters of like name and kind refer to like parts in each of the figures.

The design of my invention is to lessen the time and expense required for cutting pinions and to improve the quality of the work; and to this end said invention consists, principally, as an improvement in mechanism for cutting the teeth of pinions, in the combination of a series of cutters which are adapted by successive action to rough out and complete such teeth, a holder or a series of holders for a pinion-blank or pinion-blanks, mechanism for moving said holder or holders from cutter to cutter, and automatic mechanism for rotating each pinion-blank or pinion step by step while in position before a cutter, to bring each tooth of the same into contact with said cutter, substantially as and for the purpose hereinafter specified.

It consists, further, as an improvement in mechanism for cutting the teeth of pinions, in the combination of a series of cutters and operating mechanism therefor, substantially as described, a series of pinion-holding spindles which are adapted to present a series of pinions simultaneously to said cutters, mechanism for rotating said spindles simultaneously upon their own axes step by step, and mechanism for moving the series of spindles simultaneously to bring each into position before the next cutter of the series, substantially as and for the purpose hereinafter shown.

It consists, further, as an improvement in mechanism for cutting the teeth of pinions, in the combination of a series of cutters and operating mechanism therefor, substantially as described, a rotary carriage or turret having journaled thereon a series of pinion-holding spindles, mechanism for simultaneously rotating said spindles step by step one complete revolution, and mechanism alternating in its action with said spindle-rotating mechanism to partially rotate said turret and bring each spindle into position before the next cutter of the series, substantially as and for the purpose hereinafter set forth.

It consists, further, in an organized machine for cutting the teeth of pinions, in which are combined the following elements, to wit: a series of cutters having operating mechanism substantially as described, that are arranged in circular order, and, with exception of the first and last of the series, are separated by equal spaces, a series of pinion-holding spindles which exceed said cutters one in number and are arranged at equidistant points around a circle, mechanism for rotating said spindles step by step, and mechanism for moving the series of spindles at stated intervals, whereby the spindle having the completed pinion is brought into the space between the first and last of said cutters, and the other spindles are each brought into position to present a pinion-blank or a partially-cut pinion to one of said cutters for its action, substantially as and for the purpose hereinafter shown and described.

It consists, further, in an organized machine for cutting the teeth of pinions, in which is combined a series of spindles for holding pinion-blanks or pinions that are normally locked and prevented from rotating, a series of cutters having operating mechanism substantially as described, and adapted to perform the successive operations required to form pinion-teeth, mechanism for intermittingly unlocking said pinion-holders and giving to the same a step-by-step rotary movement, and mechanism for moving said pinion-holders while locked against rotation into position before said cutters, substantially as hereinafter specified.

It consists, further, in a pinion-cutting machine in which are combined a series of revolvable cutters that are arranged in a circle, a table which is adapted to be rotated step by step around said cutters, rotatable longitudinally-reciprocable pinion-holding spindles that are secured to and rotate with said table, and mechanism, substantially as described, whereby said slides are reciprocated only when said table is at rest, substantially as and for the purpose hereinafter shown.

It consists, further, in a pinion-cutting machine in which are combined a series of revolvable cutters that are arranged in a circle, a table which is adapted to be rotated step by step around said cutters, rotatable longitudinally-reciprocable pinion-holding spindles that are carried by and rotate with said table, and mechanism, substantially as described, whereby each spindle is reciprocated and rotated step by step only when in position before a cutter and said table is at rest, substantially as and for the purpose hereinafter specified.

It consists, further, in a pinion-cutting machine in which are combined a table that is adapted to be rotated step by step around a series of revolvable cutters, rotatable longitudinally-reciprocable pinion-holding spindles which are supported by and rotate with said table, a reciprocable ring that is journaled upon said table, and means, substantially as described, whereby, when said table is moved forward a step, said ring is automatically connected with and caused to reciprocate said spindles a predetermined number of times, and is then automatically disconnected from the same, substantially as and for the purpose hereinafter shown.

It consists, further, in a pinion-cutting machine in which are combined a table that is adapted to be rotated step by step around a series of rotatable cutters, pinion-holding spindles which are supported by and rotate with said table, a reciprocable ring that moves in the same plane as and around the axis of said table, means, substantially as described, whereby, when said table is moved forward a step, said ring is automatically connected with and caused to reciprocate said spindles a predetermined number of times, and is then automatically disconnected from the same, and means, substantially as described, whereby each spindle is partially rotated each time that it is moved longitudinally forward or back, substantially as and for the purpose hereinafter shown.

It consists, further, as an improvement in pinion-cutting mechanism, in a machine in which are combined the following elements, to wit: two or more cutter-spindles provided each with a cutter, three or more slides each adapted to support a pinion-blank, means whereby said blank may be intermittingly rotated and said slides caused to move back and forth in front of said cutters, and means whereby said slides may be successively moved into position before each cutter, substantially as and for the purpose hereinafter shown.

It consists, further, as an improvement in pinion-cutting mechanism, in a machine in which are combined a series of rotatable cutters that are arranged in circular order, an annular table which carries a number of reciprocable pinion-holding slides, mechanism, substantially as described, whereby said table may be revolved step by step around its axis to bring each slide into position before each successive cutter, and mechanism, substantially as described, whereby each slide is caused to reciprocate before each cutter and to remain at rest when between the first and last cutters of the series, substantially as and for the purpose hereinafter set forth.

It consists, further, in a pinion-cutting machine in which are combined several rotatable cutters arranged in a circle, an annular table adapted to revolve around said cutters, pinion-holding slides exceeding in number the said cutters secured to and revolving with said table, and mechanism whereby each slide is caused to reciprocate when turned to position in front of a cutter, substantially as and for the purpose hereinafter shown and described.

It consists, further, in the construction and combination of the cutters, reciprocating pinion-holding slides, the revolvable table, and the mechanism employed for giving motion to said slides, substantially as and for the purpose hereinafter specified.

It consists, further, in the means employed for journaling and adjusting laterally the cutter-spindles, substantially as and for the purpose hereinafter shown.

It consists, further, in the means employed for effecting the vertical adjustment of the cutter-spindles, substantially as and for the purpose hereinafter set forth.

It consists, further, in the means employed for intermittingly rotating the pinion-holding spindle, substantially as and for the purpose hereinafter shown and described.

It consists, further, in the means employed for locking in and releasing from position the pinion-holding spindle, substantially as and for the purpose hereinafter specified.

It consists, further, in the means employed for automatically releasing the vibrating ring from engagement with each slide whenever the pinion-holding spindle has made a complete rotation, substantially as and for the purpose hereinafter shown.

It consists, further, in the means employed for releasing the hooked bar-releasing cam from engagement with the star-wheel, substantially as and for the purpose hereinafter set forth.

It consists, further, in the means employed for automatically connecting the vibrating ring with each slide when the latter is turned to position in front of a cutter, substantially as and for the purpose hereinafter shown and described.

It consists, further, in the means employed for throwing out of position for engagement the cam used for connecting the vibrating ring with each slide, substantially as and for the purpose hereinafter specified.

It consists, finally, in the means employed for releasing the journaled table and giving to the same a partial revolution upon or around the frame, substantially as and for the purpose hereinafter shown.

In the annexed drawings, A represents the frame or body of my machine, which has a cylindrical exterior and interiorly has a bottom that slopes downward and inward and forms a receptacle for oil. Said frame is secured at its center to and is supported by means of a base, B, that has outward and upward flaring sides $b$, that extend beyond the operative parts and serve to receive and retain oil and dirt from the operative parts.

At suitable points within the frame A are provided bearings $a$, for four vertical shafts, G, which bearings extend from a point slightly above the upper edge of said frame to a point below the lower edge of the same, and are each provided with a cylindrical axial opening, $a'$, that at its lower end is enlarged for a distance of about three-fourths of an inch.

Within the axle-opening $a'$ of each bearing $a$ is fitted a quill, D, that closely fills the same, and is capable of circumferential and longitudinal motion therein. The lower projecting end of said quill has secured thereon a worm-wheel, E, which is engaged by a worm, F, that rests in suitable horizontal bearings, and is adapted to be rotated by means of a graduated head, $f$, the arrangement being such as to enable said quill to be turned circumferentially by the rotation of said worm. A pointer, $f'$, secured to a fixed support, with its end in close proximity to the graduated periphery of said head $f$, enables the degree of rotation of said quill to be accurately determined.

The quill D is provided with a round longitudinal opening, $d$, which is slightly eccentric to the axis of said quill, and near each end has an outwardly-increasing tapered part that terminates in a sharp outward flare, as shown. Into the opening $d$ is fitted a spindle, G, which has its upper portion conformed to the tapered and flared upper end of said opening, and upon its lower straight portion has fitted a thimble, $g$, which is adapted to slide lengthwise of the same, and has its periphery conformed to the tapered and flared lower portion of the said axial opening of said spindle. A nut, $g'$, fitted upon a threaded portion of said spindle immediately below said thimble, enables the latter to be regulated vertically, so as to cause said spindle to be held within its bearings as closely as necessary in order to prevent longitudinal motion or lateral vibration. The upper end of each spindle G is adapted to receive a circular cutter, $g^2$, of usual form, while its lower end is provided with a grooved pulley, H, around which, and around the similarly-grooved wheel of an ordinary counter-shaft, passes a driving-belt, $h$.

By means of the eccentrically-bored quill-bearings D and the mechanism described for rotating the same the position of each spindle G with relation to the axial center of the machine may be varied at will, so as to cause the cutter $g^2$ to cut to a greater or less depth in forming the teeth of a pinion; but in order that said cutter may be properly aligned with reference to other cutters a vertical adjustment of the spindle G is provided for, as follows, viz: Within the upper portion of the periphery of the quill D is provided a circumferential groove, $d$, into which, at one side, is fitted a block, $d^2$, that is contained within and is adapted to slide lengthwise of a vertical slot, $a^2$, which is formed within the bearing $a$. Said block has a vertical threaded opening that receives a screw, $d^3$, which passes downward from the upper end of said bearing, and by the rotation of the same enables the vertical position of said block to be varied at will. A spiral spring, $d^4$, placed within the enlarged lower portion of the opening $a'$, and arranged to exert a downward pressure upon the worm-wheel E, moves said quill downward when permitted, and leaves to said screw only the raising of the same and the determination of its vertical position.

At a point midway between the upper and lower edges of the frame A is a peripheral flange, $a^3$, which projects radially outward and has a portion of its upper face formed upon an upward and inwardly-inclined angle, while from the upper edge of such flange-face the periphery of said frame has a slight upward and inward taper.

Fitted around the upper tapered portion of the periphery of the frame A, and upon the inclined portion of the face of the flange $a^3$, is a table, I, which in plan view is five-sided, and is provided at its edge with a downward-projecting flange, $i$, and at its center with a cylindrical flange, $i'$, that conforms to and embraces the before-named portions of said frame. The table I is confined in vertical position upon the frame A by means of a ring, K, which has an L shape in cross section and fits into a circumferential groove, $i^2$, that is formed within the periphery near the lower end of the flange $i'$, and from thence extends downward outside of the same to the flange $a^3$, to which latter said ring is secured by screws $k$, that pass vertically through said parts. This arrangement enables said table to be freely revolved upon or around said frame.

Secured at equidistant points upon the upper side of the table I are five ways, L, which have the form in plan view and cross section shown in Figs. 2 and 5, and are each arranged longitudinally upon lines tangential to the inner edge of said table. The inner end of each of said ways is secured in lateral position by means of a stud, $l$, that extends from said table upward through a tapering washer or disk, $l'$, which is placed within a corresponding opening in said way and is secured fast to said table, while its outer end is primarily confined in place by means of a screw, $l^2$, which passes downward into a nut, $l^3$, that is contained within a groove in said table, and is adapted to slide therein so as to permit the outer end of said way to be moved laterally in either direction. A set-screw, $l^4$, passing horizontally inward through the side of the table I with its inner end in engagement with a stud, $l^5$, that projects downward from near the inner end of said way, enables the latter to be adjusted to position, after which said end is permanently fastened in place by means of a dowel-pin, $l^6$.

Upon the outer edge, at the upper side of the way L, is an upward extension, within which is formed a V-shaped groove, $l^7$, that is parallel with the upper face and inner edge of said way, while upon the said inner edge is secured a gib, $l^8$, which projects upward and outward over said upper face, and forms at such point a V-shaped groove, $l^9$, that is parallel with said groove $l^7$, but is arranged with its point opposite to the point of the same.

Within the grooves $l^7$ and $l^9$, and upon the upper face of the way L, is fitted a slide, M, which transversely conforms to such space, and is adapted to be moved longitudinally therein.

Upon the upper side, at the inner edge of the slide M, is provided a cylindrical housing, $m$, which has a round axial opening that extends from end to end, and receives and contains a correspondingly-shaped bushing, N. Said housing is partly or wholly split upon one side, and the edges of such split portion united by means of screws $m'$, so as to enable said bushing, when in place, to be tightly clamped and prevented from being accidentally moved. The bushing N is provided with a straight axial opening, $n$, which is round in cross-section, and at each end is enlarged by a flaring section, $n'$, which has a length of about three-fourths of an inch and a slight outwardly-increasing diameter, and a second section, $n^2$, that has a length of about one-sixteenth of an inch and a sharp outward flare.

Fitted into the bushing N is a spindle, O, which has a considerably greater length, and at its inner end has a conical head, $o$, that at its greatest diameter, immediately adjacent to the corresponding end of said bushing, has a diameter substantially equal to the latter. From said head to the inner end of the flaring section of the contiguous portion of said bushing said spindle is conformed to and closely fills the same, while from its said tapering portion $o'$ to its outer end said spindle has a smaller diameter than the axial opening $n$ of said bushing.

Fitted closely upon or over the outer end of the spindle O is a thimble, $o^2$, which is adapted to be moved thereon longitudinally, but is held in relative circumferential position by means of an ordinary feather that engages with a longitudinal groove in said spindle. Said thimble is exteriorly conformed to the flaring portions $n'$ and $n^2$ of the bushing N, and may be pressed into the same with any desired firmness by means of a nut, $o^3$, which is fitted upon a threaded portion, $o^4$, of said spindle, that is located within and immediately outside of the outer end of said thimble, and is locked in circumferential position when adjusted thereto by a radially-inserted set-screw. This construction gives to the spindle O oppositely-tapering bearings within the ends only of the bushing N, and permits of such adjustment as to prevent any play of said spindle, and to compensate for wear, while enabling the latter to be freely revolved within said bushing. The spindle O has at its inner end a tapering axial opening, $o^2$, for the reception of an ordinary female center, $o^3$, while in a line axially with the same is a tapering opening, $p$, that is formed in the end of a bar, P, which is fitted into and adapted to slide within a dovetailed groove formed in the inner face of a boss, $m^2$, that extends upward from the inner end of the slide M in a line with the housing $m$. The sliding bar P is moved toward or from the center $o^3$ by means of an L-shaped lever, $p'$, which is pivoted near one end upon a lug, $m^3$, that extends upward from the boss $m^2$, and has its short arm in turn pivoted to the outer end of said bar, the arrangement being such that a downward pressure upon the free end of said lever will cause said bar to be moved toward said center, while an upward motion of the same will cause said bar to be retracted.

The center $o^3$ and sliding bar P are intended for holding a pinion while being cut, the pivots of said pinion being contained within the openings in the ends of said parts, and said slide when adjusted to position being locked in place by means of a binding-screw, $p^2$, in the usual manner.

The slide M is adapted to be automatically reciprocated by mechanism, hereinafter described, for the purpose of moving the pinion held therein into contact with the cutters; and in order that said pinion may be rotated partially at each double movement of said slide the following-described means are employed, viz: Secured upon the outer end of the spindle O is a circular plate, Q, which is provided peripherally with a series of equidistant notches, $q$, that correspond in number to the number of teeth of the pinion to be cut, while upon the inner face of said plate is a ratchet-wheel, $q'$, which is provided with peripheral teeth $q^2$, that correspond in number to the number of said notches. At the outer end of each slide M is a lever, R, which in side elevation has an L shape, and is provided at a point above the point of intersection of its vertical and horizontal arms with a shaft, $r$, that has its inner end pointed to fit into a corresponding recess in said slide M, while upon the outer end of said shaft is formed an ordinary journal, which fits into a correspondingly-shaped opening that is formed in a bracket-bearing, R', said shaft operating as a pivotal bearing, upon and with which said lever may oscillate in a plane parallel with the plate Q. As seen in Fig. 22, the lever R extends in a curve from its pivotal bearing upward to or near a point over the center of the ratchet-wheel $q'$, and to its end has pivoted one end of a pawl, $r^2$, that from thence extends in a curve downward, with its hooked end resting upon the periphery of said ratchet-wheel, the arrangement being such that a rocking or oscillating movement of said lever upon its pivotal bearing will cause said pawl to alternately engage with and move forward, and then pass rearwardly over a tooth of said ratchet-wheel, so as to produce a partial rotation of the spindle O at each double movement of said lever. A spring, $r^3$, fastened at one end upon said lever, and having its opposite end in engagement with said pawl, operates to hold the hooked end of the latter with a yielding pressure upon said ratchet-wheel. The short horizontal arm of the lever R extends into the space beneath the top of the table I, and is provided upon its inner end, at its lower side, with a spherical stud or roller, $r^4$, which, as the slide M moves longitudinally, travels in a zigzag groove, $i^3$, that is formed at such point for its reception, the lateral inclinations of said groove being such as to give to said lever the amount of movement necessary for rotating the ratchet-wheel $q'$ one tooth at each outward motion of said slide, and to produce such rotation after the pinion being operated upon has passed out of engagement with its cutter.

In order that the index disk or plate Q may be automatically locked in and released from position at the proper times, a pawl, S, is pivoted at one end upon an arm, $m^4$, which extends upward from the slide M, and from such pivotal bearing extends outward in a curve over the edge of and in a line with said plate, and is provided near its outer end with a spur or tooth, $s$, that is adapted to engage with either of the notches $q$. From the inner side of the pawl S a lug, $s'$, extends horizontally inward over the lever R, and is engaged by a lug, $r^5$, which projects upward from said lever. Said lug $r^5$ has such height as to cause it to raise said pawl and release the tooth $s$ from engagement with the index-disk whenever said lever moves upon its pivotal bearing to rotate the spindle. The lugs $s'$ and $r^5$ have such relative proportions and arrangement as to cause the pawl S to be raised out of engagement with the index-disk Q just before the pawl $r^2$, moving forward, engages with a tooth, $q^2$, of the ratchet-wheel $q'$, and to cause said pawl S to be released and permitted to drop into contact with said disk before said lever has completed its motion in a forward direction. As no necessity exists for the raising of the pawl S during the backward motion of the pawl-lever R, the upper portion, $r^6$, of the lug $r^5$ is pivoted at one end upon a vertical axis, so as to be capable of a lateral movement of one of its ends, and is held in position in a line with the lower portion by means of a spring, $r^7$, which is secured at one end to said lug $r^5$, and at its opposite end engages with a stud, $r^8$, that projects downward from said lug $r^6$ between its pivotal bearing and its free end. The end of the lug $s'$, with which said lug $r^5$ engages when moving rearward, is beveled or rounded, and causes the latter to be pressed aside or tripped as said rearward motion is continued, while upon the forward motion of said lever R said parts operate as before. A spring coiled spirally around the pivotal bearing of the pawl S operates to hold the outer end of the same with a yielding pressure in contact with the edge of the index-disk Q.

An automatic longitudinally-reciprocating motion of the slides is secured by the following-described means, viz: Fitted into a circumferential groove, $i^4$, which is formed in the periphery of the cylindrical portion $i'$ of the table I, is a ring, T, which in cross-section has an L shape, and has the upper edge of its outer vertical portion in contact, or nearly so, with the lower face of the top of said table. Said ring is for convenience formed in two or more parts, which are united by means of screws, as shown in Figs. 14, 15, and 16, and is adapted to move freely within its said groove.

The ring T is preferably divided into five equal parts, and within each of four of the same is pivoted a bar, U, which at one end is provided with a hook, $u$, and at its opposite end has an outward-curving tail-piece, $u'$. Said bar is pivoted near said tail-piece, and by means of a flat spring, $u^2$, has its hooked end held with a yielding pressure in engagement with a stud, V, one of which is secured to each of the slides M, and extends from the same downward through a slot, $l^{10}$, that is formed within the way L and within the top of the table I, the arrangement being such as to enable said slides to be moved back and forth longitudinally by the partial revolution in opposite directions of said ring.

The desired vibratory motion of the ring T is secured by means of the following-described mechanism, viz: Journaled within suitable bearings at the lower side of the frame A is a shaft, W, which at one end is provided with a worm-wheel, $w$, and between its bearings has secured a cylindrical cam, W', that is provided within its periphery with an eccentric or irregular helical groove, $W^2$. Said groove is engaged by a stud, $t$, which is secured to and projects downward from the vibrating ring T, and laterally has such deviation from the plane of rotation as to give to said stud and its said ring the degree of motion in opposite directions which is necessary in order that the slides M may be vibrated longitudinally the required distance. Journaled immediately below, and at a right angle to the shaft W, is a second shaft, X, which near its inner end is provided with a screw-thread or worm, $x$, that engages with the teeth of the worm-wheel $w$, and at its outer end has secured thereon a cone-pulley, $x'$, around which passes a driving-belt. The mechanism thus arranged causes a continuous rotary motion of the shaft X to be converted into a constant vibratory motion of the slides M, and enables the speed of the same to be varied at will. Each slide M is intended to be moved longitudinally back and forth in front of each cutter a number of times corresponding to the number of notches $q$ of the index-plate Q and then to cease such movement. To accomplish such result a four-armed star-wheel, Y, is pivoted upon the ring T at the end and outer side of the tail-piece $u'$, and has such proportion and arrangement that when turned so that the end of the said tail-piece rests within one of its notches $y$, the hooked end $u$ of the bar U will engage with the stud V, while by partially rotating said star-wheel until one of its arms $y'$ is in engagement with said tail-piece said hooked end will be moved out of engagement with said stud, when the further vibration of the latter and of its slide will cease. Pivoted within the table I, at a point near the inner edge, at the outer end of each way L, is a cam, Z, which has the form shown in Fig. 32, and is adapted to move in a horizontal plane upon its pivotal bearing within the limits fixed by a pin, $z$, which passes from said table downward through a curved slot, $z'$, in said cam. The cam Z is held with a yielding pressure at the inner limit of its motion by means of a bar, $z^2$, that is pivoted at one end within the table I, and has its opposite end, which is provided with a roller, $z^3$, held in yielding contact with the inclined outer edge of the inner front end of said cam by means of a spring, $z^4$. When said cam is moved to the outer limit of its motion, said roller passes upon a portion of the end of the former, which is concentric with its pivotal bearing, and thus ceases to exert an inward pressure, as before.

The operation of the tripping mechanism is as follows, viz: The normal position of the cam Z is at the outer limit of its motion, but when moved to the inner limit of such motion the inner front end of the same engages with the adjacent arm $y'$ of the star-wheel Y, and causes said wheel to be turned one-eighth of a revolution, so as to bring one of said arms beneath the tail-piece $u'$ and to throw the hooked end $u$ of the arm U out of engagement with the stud V. A plate, $t'$, secured upon the ring T immediately over the pivotal bearing of said star-weeel, has an outwardly-inclining edge, which engages with the end of said cam and carries the latter out of engagement with said wheel at the proper instant, and at the same time moves said cam to its outer limit of motion again. The cam Z is moved into position for engagement with the star-wheel Y by means of a pin, $q^3$, which projects inward through the index-plate Q, and upon the inward movement of the slide M engages with an arm, $z^5$, that projects from the side of said cam whenever, by the rotation of said index, said pin and arm are brought into line with each other.

In order that the hooked levers U may be released and permitted to engage with the stud V it is necessary that the star-wheel Y of each should be turned from the position in which it is left by the cam Z, so that the tail-piece $u'$ of said lever may drop into one of the notches $y$ of said wheel. This result is secured by the following-described mechanism, viz: Secured to a spindle, A', which is journaled within the pivotal bearing of the cam Z, and within a cylindrical housing, B', that is secured to and extends downward from the lower side of the table I, is a cam, D', that has the form shown in Fig. 32, and has its upper face recessed so as to enable it to fit upward against the lower face of said cam Z, with the portion $d^1$, that projects inward beyond the latter, extended upward beside the inner edge of the same, in which position said cam D' is prevented from turning outward by the engagement of its said raised portion with the edge of said cam Z. The cam D' thus arranged is brought into engagement with the outer arm, $y'$, of the star-wheel Y by the forward rotation of the table I, and turns said wheel just the necessary distance to cause the release of the hooked lever U so that it may engage with the slide-stud V. The spindle A', which is provided at its lower end with a button, $a^2$, is adapted to be moved longitudinally downward a distance slightly greater than the elevation of the part $d^1$ above the face of the cam D', and is held at the upper limit of its motion by means of a spiral spring, E', which is coiled around said spindle, between the lower end of the housing B' and the lower side of said cam, and exerts the necessary upward pressure upon the latter. This arrangement enables said cam to be drawn downward until its raised part is below the cam Z, and may then be turned outward and prevented from engaging with the star-wheel Y whenever it is desired to suspend the action of a slide. A stud, $d^5$, projecting from the upper side of said cam D' into a curved slot, $z^6$, in said cam Z, limits the motion of said cam D', and has such length as to prevent disengagement with said slot when the same is drawn downward. The table I, being revolved until the slides M are in proper positions in front of the cutters, is locked in such position by means of a pawl, F', which is pivoted upon a bracket-arm, G', that projects from the frame A, and has its outer hooked end in engagement with one of five equidistant notches, $i^5$, that are provided within the periphery of the annular flange $i$ of said table. Said pawl is held in engagement with said notch by means of a spiral spring that is placed around its pivotal bearing and connected with the same and with said bracket-arm. The pawl F' is released from engagement with the table I, and said table rotated to bring the slides M into position before the next cutters in order by the following-described means, viz: Fitted within a circumferential groove, $i^6$, that is formed within the periphery of the annular flange $i$ of the table I, below the pawl F', is a ring, H', which is formed in sections and the same united by means of screws. (Shown by dotted lines in Fig. 10.) Said ring is provided with a radial handle, I', by means of which it may be turned in either direction within certain limits within its bearing, and upon the upper side at the inner end of said handle is pivoted a spring-operated pawl, K', which is adapted to engage with the notches $i^5$ of said flange $i$.

Upon the periphery of the ring H', at a point in front of the pawl F', is a roller, L', which projects outward and has such arrangement with relation to the latter as to cause it, when said ring is moved rearward, to pass beneath said pawl and to impinge upon an inclined lug, $f^2$, that is secured upon the lower side of the same, such movement operating to throw said pawl out of engagement with the table and to leave the latter free to be turned. The roller L' is arranged to pass beneath and release the pawl F' just before the pawl K' engages with a notch, $i^5$, and to hold the former out of engagement until the table has been turned a short distance, after which said roller passes from beneath said pawl F' and leaves the same free to engage with the next succeeding notch whenever said table has been turned sufficiently to bring said notch into position for such operation.

The operation of the machine thus described is as follows, viz: Cutters and reciprocating mechanism are provided for but four slides, so that one slide, nearest to the operator, is always stationary and in condition for the ready insertion within or removal therefrom of the pinion-blank or completed pinion. In starting the machine the cutters are set in motion, a pinion-blank is placed within the slide nearest to the operator by placing one of its pivots within the female center $o^5$ and moving the bar P inward until its tapering spring $p$ engages with the other pivot of said blank, as shown in Fig. 20, and the table then turned forward one-fifth of a revolution by means of the ring H' and its handle I', so as to bring said slide in front of the first of said cutters. The turning of said table causes said slide to be thrown into engagement with the reciprocating mechanism, and said pinion-blank is moved to and fro against said cutter, and is partly revolved after each double motion until the spaces between the teeth or leaves of the pinion are roughly formed, when, by means of the mechanism before described, the motion of said slide is arrested. While the first pinion is being roughly cut, as described, a second blank is placed in the next slide, and after the stoppage of the movements of the first slide the table is turned so as to bring the same in front of the second cutter and the second slide in front of the first cutter, each of which cutters then proceeds with and completes its work. The operations described are continued and each pinion-blank caused to pass forward and back in front of and in contact with each of the cutters a number of times equal to the number of teeth to be cut, such number being regulated by the indexing mechanism and the blank being partially rotated before each cut. Having been operated upon by each of said cutters the completed pinion is removed and a blank inserted in its place. By the arrangement of mechanism shown, while four pinion-blanks are being simultaneously operated upon by the different cutters, one slide is at rest for the removal of the completed pinion and the insertion of a blank, by which means no time is lost by the operator and a large increase is effected in the quantity of work done. As the pinion is not removed from its bearings from the commencement until the completion of the cutting operation, no liability exists for poor work, as it is impossible that the cutters should fail to cut in the same channel when once properly aligned. For the purpose of readily effecting such alignment one slide, M, is provided with a socket, $m^5$, for the reception of one end of a removable lever, M', which passes inward through a socket, N', that is pivoted upon the table I immediately in front of said slide. The pinion-blank being placed within said slide, the latter is, by means of said lever, moved back and forth in front of each cutter, and said cutter adjusted, if necessary, until one or more grooves shall each show the marks of each cutter.

During the alignment of the cutters, and at any other time desired, each or all of the cams D' may be thrown out of position for engagement with the star-wheel Y, as before described, and the table I, and the slides M left free to be moved at pleasure.

Having thus fully set forth the nature and merits of my invention, what I claim as new is—

1. As an improvement in mechanism for cutting the teeth of pinions, the combination of a series of cutters which are adapted by successive action to rough out and complete such teeth, a holder or a series of holders for a pinion-blank or pinion blanks, mechanism for moving said holder or holders from cutter to cutter, and automatic mechanism for rotating each pinion-blank or pinion step by step, while in position before a cutter, to bring each tooth of the same into contact with said cutter, substantially as and for the purpose specified.

2. As an improvement in mechanism for cutting the teeth of pinions, the combination of a series of cutters, and operating mechanism therefor, substantially as described, a series of pinion-holding spindles which are adapted to present a series of pinions simultaneously to said cutters, mechanism for rotating said spindles simultaneously upon their own axes step by step, and mechanism for moving the series of spindles simultaneously to bring each into position before the next cutter of the series, substantially as and for the purpose shown.

3. As an improvement in mechanism for cutting the teeth of pinions, the combination of a series of cutters, and operating mechanism therefor, substantially as described, a rotary carriage or turret having journaled thereon a series of pinion-holding spindles, mechanism for simultaneously rotating said spindles step by step one complete revolution, and mechanism alternating in its action with said spindle-rotating mechanism to partially rotate said turret and bring each spindle into position before the next cutter of the series, substantially as and for the purpose set forth.

4. An organized machine for cutting the teeth of pinions, in which are combined the following elements, to wit: a series of cutters having operating mechanisms, substantially as described, that are arranged in circular order, and with exception of the first and last of the series are separated by equal spaces, a series of pinion-holding spindles which exceed said cutters one in number and are arranged at equidistant points around a circle, mechanism for rotating said spindles step by step, and mechanism for moving the series of spindles at stated intervals, whereby the spindle having the completed pinion is brought into the space between the first and last of said cutters, and the other spindles are each brought into position to present a pinion-blank or a partially-cut pinion to one of said cutters for its action, substantially as and for the purpose shown and described.

5. An organized machine for cutting the teeth of pinions, in which is combined a series of spindles for holding pinion-blanks or pinions that are normally locked and prevented from rotating, a series of cutters having operating mechanism, substantially as described, and adapted to perform the successive operations required to form pinion-teeth, mechanism for intermittingly unlocking said pinion-holders and giving to the same a step-by-step rotary movement, and mechanism for moving said pinion-holders, while locked against rotation, into position before said cutters, substantially as specified.

6. As an improvement in pinion-cutting mechanism, a machine in which are combined the following elements, to wit: two or more cutter-spindles provided each with a cutter, three or more slides each adapted to support a pinion-blank, means whereby said blank may be intermittingly rotated and said slides caused to move back and forth in front of said cutters, and means whereby said slides may be successively moved into position before each cutter, substantially as and for the purpose shown.

7. As an improvement in pinion-cutting mechanism, a machine in which are combined a series of rotatable cutters that are arranged in circular order, an annular table which carries a number of reciprocable pinion-holding slides, mechanism, substantially as described, whereby said table may be revolved step by step around its axis to bring each slide into position before each successive cutter, and mechanism, substantially as described, whereby each slide is caused to reciprocate before each cutter and to remain at rest when between the first and last cutters of the series, substantially as and for the purpose set forth.

8. A pinion-cutting machine in which are combined several rotating cutters arranged in a circle, an annular table adapted to revolve in said cutters, pinion-holding slides exceeding in number the said cutters secured to and revolving with said table, and mechanism whereby each slide is caused to reciprocate when turned to position in front of a cutter, substantially as and for the purpose shown and described.

9. A pinion-cutting machine in which are combined a series of revolvable cutters that are arranged in a circle, a table which is adapted to be rotated step by step around said cutters, rotatable longitudinally-reciprocable pinion-holding spindles that are secured to and rotate with said table, and mechanism, substantially as described, whereby said slides are reciprocated only when said table is at rest, substantially as and for the purpose shown.

10. A pinion-cutting machine in which are combined a series of revolvable cutters that are arranged in a circle, a table which is adapted to be rotated step by step around said cutters, rotatable longitudinally-reciprocable pinion-holding spindles that are carried by and rotate with said table, and mechanism, substantially as described, whereby each spindle is reciprocated and rotated step by step only when in position before a cutter and said table is at rest, substantially as and for the purpose specified.

11. A pinion-cutting machine in which are combined a table that is adapted to be rotated step by step around a series of revolvable cutters, rotatable longitudinally-reciprocable pinion-holding spindles which are supported by and rotate with said table, a reciprocable ring that is journaled upon said table, and means, substantially as described, whereby, when said table is moved forward a step, said ring is automatically connected with and caused to reciprocate said spindles a predetermined number of times, and is then automatically disconnected from the same, substantially as and for the purpose shown.

12. A pinion-cutting machine in which are combined a table that is adapted to be rotated step by step around a series of rotatable cutters, pinion-holding spindles which are supported by and rotate with said table, a reciprocable ring that moves in the same plane as and around the axis of said table, means, substantially as described, whereby, when said table is moved forward a step, said ring is automatically connected with and caused to reciprocate said spindles a predetermined number of times and is then automatically disconnected from the same, and means, substantially as described, whereby each spindle is partially rotated each time that it is moved longitudinally forward or back, substantially as and for the purpose shown.

13. The combination of the frame A, the vertical spindles G, having the cutters $g'$, the table I, supported by and capable of being revolved around said frame, the slides M, each adapted to hold a pinion-blank and to reciprocate upon said table, the ring T, fitted within and arranged to reciprocate around said frame, the hooked bars U, pivoted upon said ring, and the studs V, projecting downward from said slides and engaged by said hooked bars, substantially as and for the purpose specified.

14. As a means for journaling in position and adjusting laterally the cutter-spindle G, the quill D, fitted within the bearing $a$ and provided with an eccentric axial opening, $d$, for the reception of said spindle, the worm-wheel E, secured to the lower end of said quill, and the worm F, adapted to engage with said wheel, all combined to operate substantially as shown.

15. As a means for adjusting the cutter-spindle G longitudinally, and in combination therewith, the quill D, fitted within the bearing $a$ and provided with the circumferential groove $d'$, the block $d^2$, engaging with said groove, adapted to slide within the vertical slot $a^2$, and the screw $d^3$, journaled within the upper end of said bearing and having its threaded end contained within a threaded opening in said block, substantially as set forth.

16. As a means for rotating the spindle O, and in combination therewith, the ratchet-wheel $q'$, the lever R, pivoted upon the outer end of the slide M, provided at its upper end with the pawl $r^2$, and the table I, having the cam-groove $i^3$, which receives and contains the lower end, $r^4$, of said lever, substantially as shown and described.

17. As a means for locking in and releasing from position the spindle O, the index-plate Q, secured to the end of said spindle and provided with the peripheral notches $q$, the pawl S, pivoted upon the arm $m^4$ of the slide M and provided with the laterally-projecting lug $s'$, and the pivoted reciprocating lever R, having the pivoted laterally-swinging spring-pressed lug $r^5$, all combined to operate substantially as specified.

18. In combination with the reciprocating ring T, provided with the hooked bars U, the star-wheels Y, provided each with notches $y$ and arms $y'$, the cams Z, pivoted within the table I and provided each with an arm, $z^5$, and the pins $q^3$, projecting inward through the index-plates Q, substantially as and for the purpose shown.

19. In combination with the star-wheel Y and cam Z, the plate $t'$, secured upon the vibrating ring T immediately over said wheel and operating to disengage said cam when said wheel has been rotated the required distance, substantially as set forth.

20. In combination with the hooked bar U and star-wheel Y, pivoted upon the vibrating ring T, the cam D′, secured to the table I and adapted to engage with an arm, $y'$, of said star-wheel upon the rearward movement of said ring, substantially as and for the purpose shown and described.

21. In combination with the cam D′, provided with the raised part $d^5$, which is adapted to engage with the inner edge of the cam Z, the spindle A', secured to said cam D', journaled within the housing B' and capable of being moved longitudinally within its bearings, and the spring E', arranged to hold said spindle with a yielding pressure at the upper limit of its motion, substantially as and for the purpose specified.

22. In combination with the table I, journaled upon the frame A, and provided with the stop-notches $i^5$, and with the locking-pawl F', having the inclined lug $f^2$, the ring H', journaled upon said frame, and provided with the handle I', pawl K', and peripheral roller L', substantially as and for the purpose shown.

In testimony that I claim the foregoing I have hereunto set my hand this 7th day of September, 1883.

FRANK LEMAN.

Witnesses:
R. M. IRELAND,
GEORGE HUNTER.